United States Patent
Hwang et al.

(10) Patent No.: US 9,927,239 B2
(45) Date of Patent: Mar. 27, 2018

(54) MICROMACHINED CROSS-HATCH VIBRATORY GYROSCOPES

(71) Applicant: Analog Devices, Inc., Norwood, MA (US)

(72) Inventors: Eugene Oh Hwang, Melrose, MA (US); Sunil Ashok Bhave, West Lafayette, IN (US)

(73) Assignee: Analog Devices, Inc., Norwood, MA (US)

( * ) Notice: Subject to any disclaimer, the term of this patent is extended or adjusted under 35 U.S.C. 154(b) by 127 days.

(21) Appl. No.: 14/924,078

(22) Filed: Oct. 27, 2015

(65) Prior Publication Data
US 2016/0349054 A1    Dec. 1, 2016

Related U.S. Application Data

(60) Provisional application No. 62/169,547, filed on Jun. 1, 2015.

(51) Int. Cl.
*G01C 19/00*    (2013.01)
*G01C 19/5656*    (2012.01)
*G01C 19/5649*    (2012.01)

(52) U.S. Cl.
CPC ..... *G01C 19/5656* (2013.01); *G01C 19/5649* (2013.01)

(58) Field of Classification Search
CPC ............ G01C 19/5656; G01C 19/5649; G01C 19/574
(Continued)

(56) References Cited

U.S. PATENT DOCUMENTS

| 2,309,853 A | 2/1943 | Lyman et al. |
| 2,513,340 A | 7/1950 | Lyman |

(Continued)

FOREIGN PATENT DOCUMENTS

| JP | 11-325917 | 11/1999 |
| JP | 2001-194154 | 7/2001 |

(Continued)

OTHER PUBLICATIONS

Ansari, "Modeling and Vibration Analysis of a Rocking-mass Gyroscope System," A Thesis in Partial Fulfillment of the Requirements for the Degree of Master of Applied Science Mechanical Engineering, University of Ontario Institute of Technology, 138 pages, Apr. 2008.

(Continued)

*Primary Examiner* — Walter L Lindsay, Jr.
*Assistant Examiner* — Ruth Labombard
(74) *Attorney, Agent, or Firm* — Wolf, Greenfield & Sacks, P.C.

(57) ABSTRACT

One-axis and two-axis vibratory gyroscopes include a unitary resonator structure conceptually having four beams interconnected in a cross-hatch configuration. While each beam can be considered a unitary piece of material, each beam's attachment to two cross beams conceptually divides the resonant beam into a central section between the attachment points and two tail sections aft of the attachment points. The attachment points are preferably nodal points of the beam with respect to both a drive mode shape and a sense mode shape of the beam for the resonant mode in which the resonator is configured to operate. Thus, the location where two beams intersect is preferably a nodal point for both beams. The tail sections of each beam allow the resonant mode of the resonator to be carefully configured.

20 Claims, 13 Drawing Sheets

(58) Field of Classification Search
USPC .......................................... 73/504.12, 504.14
See application file for complete search history.

(56) References Cited

U.S. PATENT DOCUMENTS

| | | | |
|---|---|---|---|
| 3,520,195 A | 7/1970 | Tehon | ........................... 310/366 |
| 4,511,821 A | 4/1985 | Nakamura et al. | |
| 4,836,023 A | 6/1989 | Oikawa | |
| 4,884,446 A | 12/1989 | Ljung | |
| 4,929,860 A | 5/1990 | Hulsing, II et al. | .......... 310/366 |
| 5,025,346 A | 6/1991 | Tang et al. | |
| 5,193,391 A | 3/1993 | Cage | |
| 5,226,324 A | 7/1993 | Oikawa et al. | |
| 5,275,047 A | 1/1994 | Zabler et al. | |
| 5,345,822 A | 9/1994 | Nakamura et al. | |
| 5,349,855 A | 9/1994 | Bernstein et al. | |
| 5,359,893 A | 11/1994 | Dunn | |
| 5,367,217 A | 11/1994 | Norling | ........................... 310/370 |
| 5,392,650 A | 2/1995 | O'Brien et al. | |
| 5,430,342 A | 7/1995 | Watson | |
| 5,635,640 A | 6/1997 | Geen | |
| 5,635,641 A | 6/1997 | Kakehi et al. | |
| 5,869,760 A | 2/1999 | Geen | |
| 5,992,233 A | 11/1999 | Clark | |
| 6,250,158 B1 | 6/2001 | Stewart | ....................... 73/504.14 |
| 6,370,954 B1 | 4/2002 | Zerbini et al. | |
| 6,564,638 B1 | 5/2003 | Ebara | ......................... 73/504.14 |
| 6,837,107 B2 | 1/2005 | Geen | |
| 6,955,084 B2 | 10/2005 | Challoner et al. | |
| 7,174,785 B2 | 2/2007 | Stewart | |
| 7,392,702 B2 | 7/2008 | Stewart et al. | |
| 7,565,839 B2 | 7/2009 | Stewart et al. | |
| 7,886,598 B2 | 2/2011 | Wyse et al. | |
| 8,561,466 B2 | 10/2013 | Wyse et al. | |
| 8,910,517 B2 | 12/2014 | Takahashi et al. | |
| 2005/0188766 A1 | 9/2005 | Matsunaga et al. | ........ 73/504.14 |
| 2005/0217376 A1 | 10/2005 | Ohta et al. | ................... 73/504.16 |
| 2013/0061680 A1 | 3/2013 | Sato | ................................ 73/662 |
| 2013/0277775 A1* | 10/2013 | Roland | .............. G01C 19/5747 257/415 |

FOREIGN PATENT DOCUMENTS

| | | |
|---|---|---|
| JP | 2003-240557 | 8/2003 |
| JP | 2003-315046 | 11/2003 |
| WO | WO 2011/086633 | 7/2011 |

OTHER PUBLICATIONS

Geen et al., "New iMEMS®—Angular—Rate—Sensing Gyroscope," Analog Dialogue 37-03, pp. 1-4, 2003.

Liu et al., "Analysis of High Shocking Resistance of an Improved Node-Plane Supporting Vibration Beam Gyroscope," International Journal of Digital Content Technology and its Applications, vol. 6, No. 9, 10 pages, May 2012.

Roland et al., "GaAs 3-axis Coriolis vibrating micro rate gyro: concept and preliminary characterization," Science Direct, vol. 5, pp. 1442-1445, Sep. 5-8, 2010.

Xia et al., "The Development of Micromachined Gyroscope Structure and Circuitry Technology," Sensors, ISSN 1424-8220, vol. 14, Issue 1, 14 pages, Jan. 14, 2014.

International Searching Authority, International Search Report—International Application No. PCT/US2016/034998, dated Sep. 11, 2016, together with the Written Opinion of the International Search Authority, 10 pages.

International Preliminary Report on Patentability dated Dec. 14, 2017 in connection with International Application No. PCT/US2016/034998.

* cited by examiner

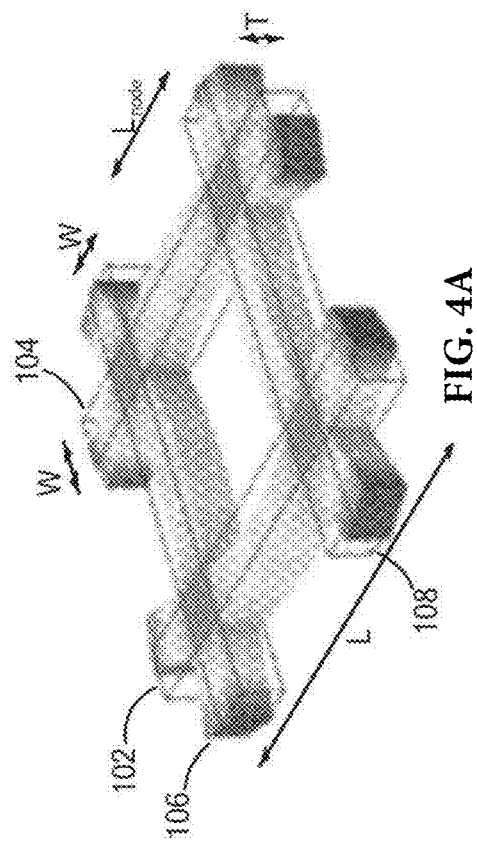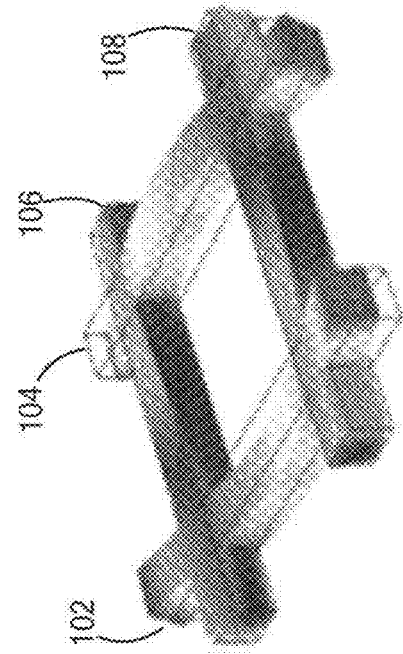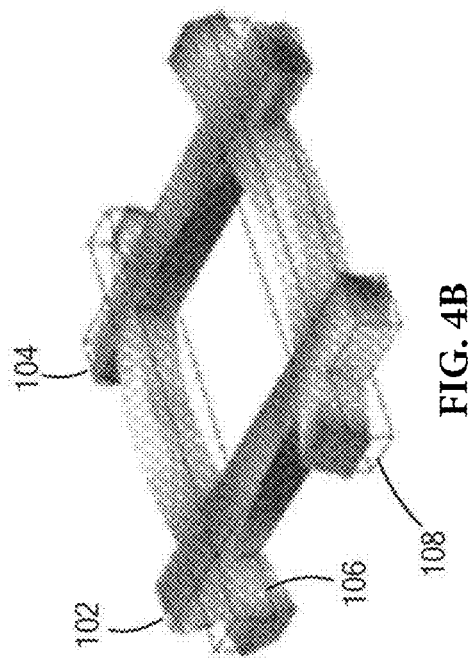
FIG. 4A
FIG. 4C
FIG. 4B

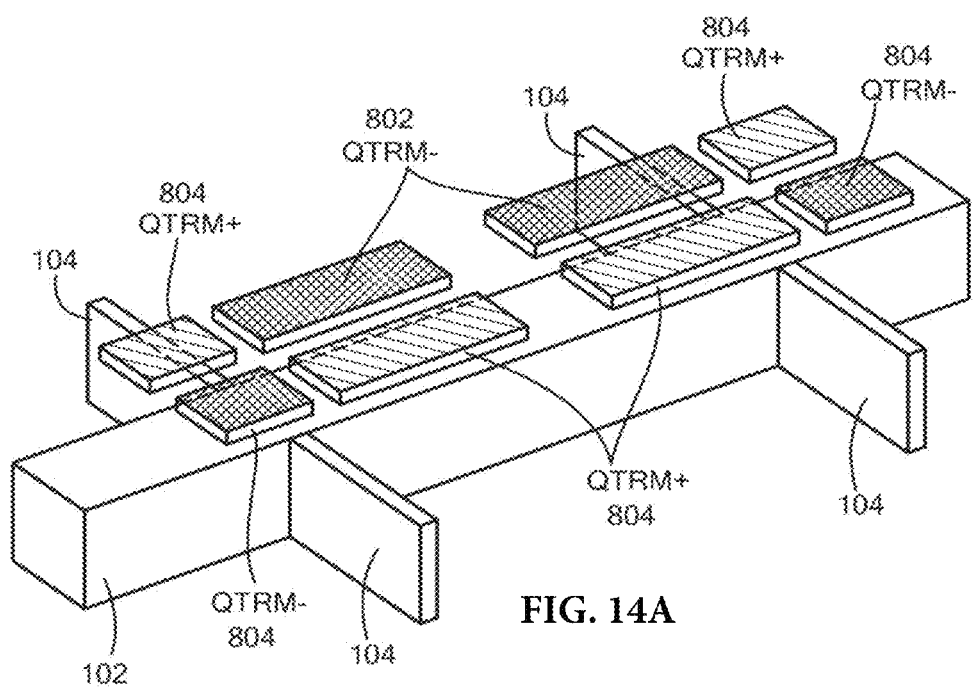
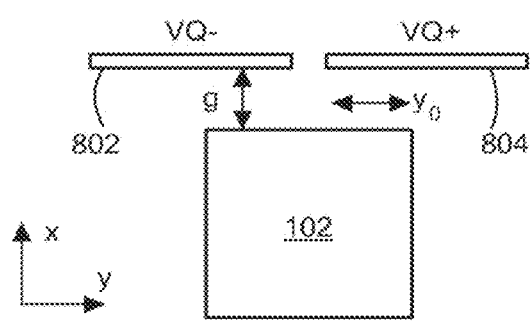
FIG. 14A
FIG. 14B

MICROMACHINED CROSS-HATCH VIBRATORY GYROSCOPES

CROSS-REFERENCE TO RELATED APPLICATION(S)

This patent application claims the benefit of United States Provisional Patent Application No. 62/169,547 entitled MICROMACHINED GYROSCOPES filed on Jun. 1, 2015, which is hereby incorporated herein by reference in its entirety.

The subject matter of this patent application may be related to the subject matter of commonly-owned U.S. patent application Ser. No. 14/924,085 entitled MICROMACHINED RESONATING BEAM GYROSCOPES filed on even date herewith, which is hereby incorporated herein by reference in its entirety.

FIELD OF THE INVENTION

The present invention relates generally to micromachined gyroscopes.

BACKGROUND OF THE INVENTION

Micromachined (MEMS) gyroscopes have become established as useful commercial items. Generally speaking, a MEMS gyroscope incorporates two high-performing MEMS devices, specifically a self-tuned resonator in the drive axis and a micro-acceleration sensor in the sensing axis. Gyroscope performance is very sensitive to such things as manufacturing variations, errors in packaging, driving, linear acceleration, and temperature, among other things. Basic principles of operation of angular-rate sensing gyroscopes are well understood and described in the prior art.

The principles of vibratory sensing angular rate gyroscopes with discrete masses are long-established. Generally speaking, a vibratory rate gyroscope works by oscillating a proof mass (also referred to herein as a "shuttle" or "resonator"). The oscillation is generated with a periodic force applied to a spring-mass-damper system at the resonant frequency. Operating at resonance allows the oscillation amplitude to be large relative to the force applied. When the gyroscope is rotated, Coriolis acceleration is generated on the oscillating proof mass in a direction orthogonal to both the driven oscillation and the rotation. The magnitude of Coriolis acceleration is proportional to both the velocity of the oscillating proof mass and the rotation rate. The resulting Coriolis acceleration can be measured by sensing the deflections of the proof mass. The electrical and mechanical structures used to sense such deflections of the proof mass are referred to generally as the accelerometer.

SUMMARY OF EXEMPLARY EMBODIMENTS

In certain embodiments there is provided a gyroscope comprises a resonator having at least four beams coupled in a cross-hatch configuration in a device plane, the resonator including a first set of beams arranged parallel to a first axis in the device plane and a second set of beams arranged parallel to a second axis in the device plane normal to the first axis, each beam of the first set of beams coupled to at least two beams of the second set of beams at nodal points of said beam defined with respect to a first set drive mode shape and a first sense mode shape for said beam, said nodal points being remote from the ends of said beam such that said beam includes a tail portion at each end of said beam. The gyroscope also includes a set of drive electrodes configured for driving the resonator into a drive mode that includes a fundamental or higher order flexural mode of the first set of beams defining the first set drive mode shape, and a set of sense electrodes configured for sensing deflections of at least one beam of the first set of beams caused by rotation of the gyroscope about the first axis, said deflections defining the first sense mode shape.

In certain other embodiments there is provided a method of operating a gyroscope having a resonator including at least four beams coupled in a cross-hatch configuration in a device plane, the resonator including a first set of beams arranged parallel to a first axis in the device plane and a second set of beams arranged parallel to a second axis in the device plane normal to the first axis, each beam of the first set of beams coupled to at least two beams of the second set of beams at nodal points of said beam defined with respect to a first set drive mode shape and a first sense mode shape for said beam, said nodal points being remote from the ends of said beam such that said beam includes a tail portion at each end of said beam. The method involves driving the resonator into a drive mode that includes a fundamental or higher order flexural mode of the first set of beams, said fundamental or higher order flexural mode of the first set of beams defining the first set drive mode shape and sensing deflections of at least one beam of the first set of beams caused by rotation of the gyroscope about the first axis, said deflections defining the first sense mode shape.

In still other embodiments there is provided a gyroscope comprising a cross-hatch resonator means, means for driving the resonator into a drive mode that includes a fundamental or higher order flexural mode of a first set of beams defining a first set drive mode shape, and means for sensing deflections of at least one beam of the first set of beams caused by rotation of the gyroscope about a first axis, said deflections defining a first sense mode shape.

In various alternative embodiments, the first set drive mode shape may be out-of-plane and the first sense mode shape may be in-plane, or the first set drive mode shape may be in-plane and the first sense mode shape may be out-of-plane.

In various alternative embodiments, each beam of the second set of beams may be coupled to at least two beams of the first set of beams at nodal points of said beam defined with respect to a second set drive mode shape and a second sense mode shape for said beam, said nodal points being remote from the ends of said beam such that said beam includes a tail portion at each end of said beam. In such alternative embodiments, the drive mode may further include a fundamental or higher order flexural mode of the second set of beams defining the second set drive mode shape, and the set of sense electrodes may be further configured for sensing deflections of at least one beam of the second set of beams caused by rotation of the gyroscope about the second axis, said deflections defining the second sense mode shape. The first set drive mode shape may be the same as the second set drive mode shape or may be different than the second set drive mode shape; the beams of the first set of beams may be the same length as the beams of the second set of beams or may be a different length than the beams of the second set of beams; the beams of the first set of beams may be the same width as the beams of the second set of beams or may be a different width than the beams of the second set of beams; the beams of the first set of beams have the same proportions as the beams of the second set of beams or may have different proportions than the beams of the second set of beams; and/or the first sense mode shape may be the same as the second sense mode shape or may be different than the second sense mode shape.

In any of the above-described embodiments, the resonator or resonator means may be a unitary structure from a single layer of material. The resonator or resonator means may supported by at least one support system including a central anchor and tethers extending from the central anchor to a number of nodal attachment points. The relative length of the tail portions of each beam may be characterized by a node ratio of the beam Lnode/L approximately equal to $X/(2*(X+1))$, where Lnode is the length from the center of the beam to a nodal point, L is the total length of the beam, and X is the order of the flexural drive mode for the beam.

Also, in any of the above-described embodiments, modal coupling may be mitigated by providing compensation signals to sets of variable-overlap trim electrodes to produce forces in the direction of erroneous beam deflections. For example, the sets of variable-overlap trim electrodes may include a first set of trim electrodes including at least one electrode placed along a center portion on one side of the beam and at least one electrode placed along each tail section on the other side of the beam, and a second set of trim electrodes opposing the first set of trim electrodes, wherein the trim electrodes variably overlap the beam with respect to a direction of such deflections and are configured to produce forces in the direction of such deflections to compensate for erroneous beam deflections in the direction of such deflections. The erroneous beam deflections may be in proportion to resonation of the beam in the drive mode.

Additional embodiments may be disclosed and claimed.

BRIEF DESCRIPTION OF THE DRAWINGS

The foregoing features of embodiments will be more readily understood by reference to the following detailed description, taken with reference to the accompanying drawings, in which:

FIGS. 4A, 4B, and 4C schematically show a first possible drive mode and corresponding sense modes for a two-axis gyroscope of the type shown in FIG. 1, in accordance with one exemplary embodiment;

FIGS. 14A and 14B are schematic diagrams showing an arrangement of split electrodes for reducing modal coupling, in accordance with one exemplary embodiment.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

In exemplary embodiments, one-axis and two-axis vibratory gyroscopes include a unitary resonator structure conceptually having four beams interconnected in a cross-hatch configuration. While each beam can be considered a unitary piece of material, each beam's attachment to two cross beams conceptually divides the resonant beam into a central section between the attachment points and two tail sections aft of the attachment points. The attachment points are preferably nodal points of the beam with respect to both a drive mode shape and a sense mode shape of the beam for the resonant mode in which the resonator is configured to operate. Thus, the location where two beams intersect is preferably a nodal point for both beams. The tail sections of each beam allow the resonant mode of the resonator to be carefully configured.

For purposes of the following description and the accompanying claims, a "set" includes one or more members, the "mode" of a resonating body is the shape of motion of the body at resonance, the term "anti-phase" with respect to the resonant modes (i.e., displacement) of two resonating bodies means that the resonating bodies resonate with the same mode shape but 180 degrees out-of-phase, the term "in-plane" with respect to a resonant mode means resonance predominately in the plane of the resonator structure(s), the term "out-of-plane" with respect to a resonant mode means resonance predominately normal to the plane of the resonator structure(s), a "node" or "nodal point" with respect to a resonating body is a point or area of the resonant motion having zero or near zero displacement, an "anti-node" with respect to a resonating body is a point or area of the resonant motion having the largest displacement, and an "electrode" is a structure through which an electrical or electromechanical effect is applied and/or sensed. In exemplary embodiments, various electrodes are used for driving resonators into their targeted mode shape at the designed frequency and/or sensing electrical or electromechanical effects through capacitive coupling (e.g., between a resonator mass and one or more adjacent structures), although it should be noted that other types of electrodes and couplings may be used (e.g., piezoelectric). Thus, in exemplary embodiments, electrodes may include a resonator mass and one or more structures for driving and/or sensing movement of the resonator mass.

Figure 1:
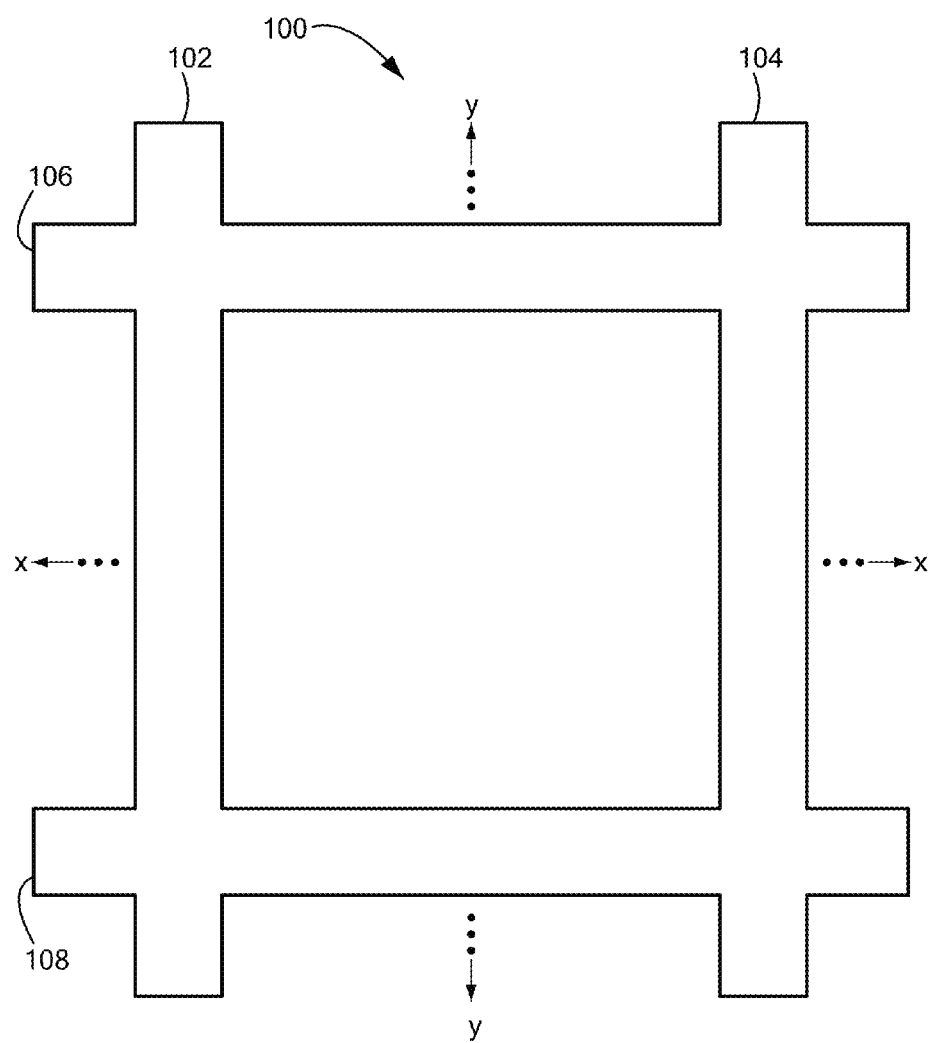
FIG. 1 is a schematic diagram showing a top view of an arrangement of a resonator for a two-axis gyroscope, in accordance with certain exemplary embodiments.

FIG. 1 is a schematic diagram showing a top view of a resonator 100 for a two-axis gyroscope, in accordance with certain exemplary embodiments. This resonator 100 is a unitary structure conceptually having four resonant beams interconnected in a cross-hatch configuration, specifically a first pair of beams 102, 104 arranged parallel to the y-axis and a second pair of beams 106, 108 arranged parallel to the x-axis. The beams are generally rectangular with a rectangular (e.g., square or non-square) cross-section and may be formed by various MEMS fabrication processes from the device layer of a wafer, e.g., from the top silicon layer of a silicon-on-insulator (SOI) wafer or from a layer of deposited material. The resonator 100 typically is fabricated as a unitary structure from a layer of material.

In certain exemplary embodiments, the resonator 100 is driven into a drive mode that includes a fundamental or higher order flexural mode of the first pair of beams 102, 104 (sometimes referred to herein as the "first set drive mode shape"), and that further includes a fundamental or higher order flexural mode of the second pair of beams 106, 108 (sometimes referred to herein as the "second set drive mode shape"). Typically, the first and second set drive mode shapes are in-plane, although the first and second set drive mode shapes may be out-of-plane in certain alternative embodiments. The resonator 100 can be driven using one or more drive electrodes placed alongside one or more of the beams (e.g., placed in-plane at one or both sides of one or more of the beams for a resonator drive mode that includes in-plane flexural modes, or placed above and/or below one or more of the beams for a resonator mode that includes out-of-plane flexural modes), typically at or near the anti-node(s) of the corresponding set drive mode shape(s). With the resonator 100 driven into one such drive mode, rotations about the y-axis cause deflections of the beams 102, 104 (sometimes referred to herein as the "first sense mode shape"), while rotations about the x-axis cause deflections of the beams 106, 108 (referred to herein as the "second sense mode shape"). For in-plane first and second set drive mode shapes, the sense mode shapes generally are out-of-plane, while for out-of-plane first and second set drive mode shapes, the sense mode shapes generally are in-plane. Generally speaking, the first and second sense mode shapes will be similar to the first and second set drive mode shapes, respectively (e.g., if the first set drive mode shape is a fundamental flexural mode, then the first sense mode shape generally will look like a fundamental flexural mode; if the first set drive mode shape is a second order flexural mode, then the first sense mode shape generally will look like a second order flexural mode; etc.). These deflections are caused by Coriolis forces and can be detected using one or more sense electrodes placed alongside each beam (e.g., placed above and/or below one or more of the beams for out-of-plane sense mode shapes, or placed in-plane at one or both sides of one or more of the beams for in-plane sense mode shapes), typically at or near the anti-node(s) of the sense mode shape(s). In certain exemplary embodiments, the drive and sense electrodes use electrostatic transduction, although other types of transduction may be used in various alternative embodiments (e.g., piezoelectric transduction).

Figure 2:
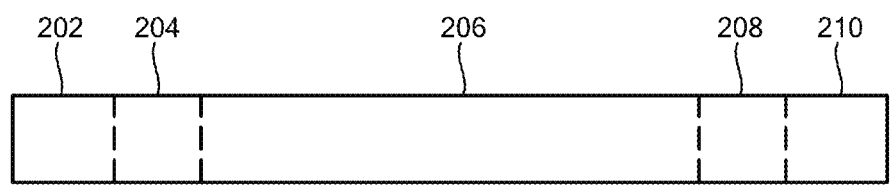
FIG. 2 is a schematic diagram showing conceptual components of a resonant beam of the resonator shown in FIG. 1, in accordance with exemplary embodiments of the invention.

FIG. 2 is a schematic diagram showing conceptual components of a resonant beam of the resonator 100, in accordance with exemplary embodiments of the invention. While each resonant beam can be considered a unitary piece of material, the beam's attachment to two cross beams at locations 204 and 208 conceptually divides the resonant beam into a central section 206 and two tail sections 202 and 210. The locations 204 and 208 are preferably at nodal points of the resonant beam with respect to both the set drive mode shape and the sense mode shape of the resonant beam for the resonant mode in which the resonator 100 is configured to operate. Thus, the location where two beams intersect is preferably a nodal point for both beams.

Figure 3:
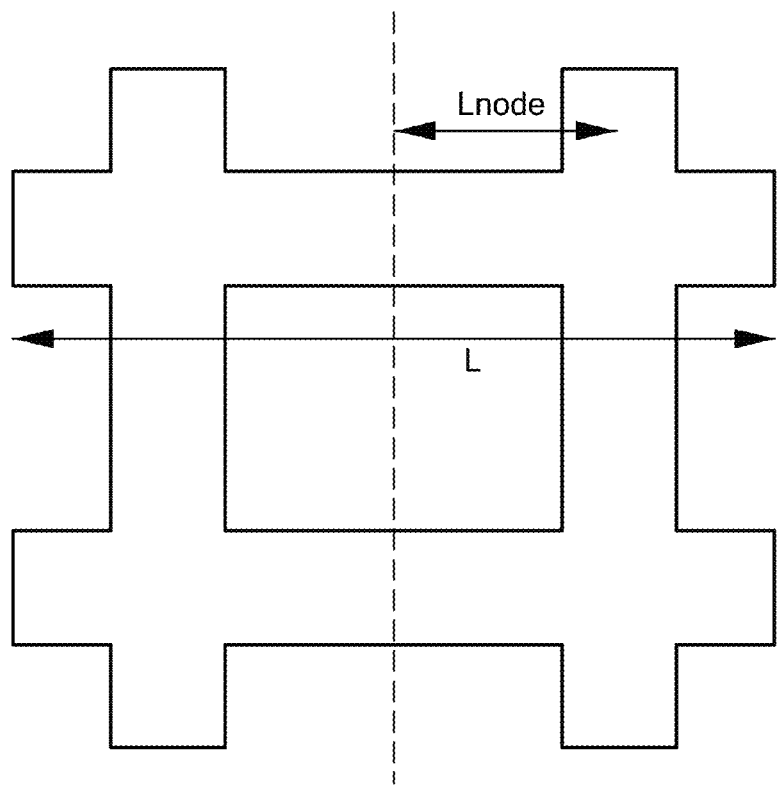
FIG. 3 is a schematic diagram depicting two parameters for determining the node ratio of a resonant beam, in accordance with one exemplary embodiment.

It is important to note that the tail sections of each beam are very important for allowing the resonant mode of the resonator 100 (e.g., the first and second set drive mode shapes, the first and second sense mode shapes, and the resonance frequency of the resonator 100) to be carefully configured. Each resonant beam can be characterized by a node ratio, which is a parameter quantifying how long the tail portion is relative to the length of the beam. FIG. 3 is a schematic diagram depicting two parameters, Lnode and L, for determining the node ratio of a resonant beam, in accordance with one exemplary embodiment, where Lnode is the length of the portion of the resonant beam from the center point to the nominal nodal point, L is the length of the resonant beam, and the node ratio=Lnode/L. In exemplary embodiments, the target node ratio can be approximated by node ratio=Lnode/L=X/(2*(X+1)), where X is the order of the flexural mode for the beam. For example, the Lnode/L target node ratio for a fundamental (first order) flexural mode is approximately 1/4=0.25 (actually 0.275 in certain specific exemplary embodiments, the Lnode/L target node ratio for a second order flexural mode is approximately 2/6=0.33, etc. Of course, an alternative node ratio value could be based on the length of the tail portion (e.g., Ltail=L−Lnode, alternative node ratio=Ltail/L).

FIGS. 4A-4C schematically show a first possible drive mode and corresponding sense modes for a two-axis resonating beam gyroscope having a resonator of the type shown in FIG. 1. In this exemplary embodiment, the first set drive mode shape for beams 102, 104 and the second set drive mode shape for beams 106, 108 are substantially the same, i.e., each beam resonates in-plane in its fundamental (first harmonic) flexural mode. In this exemplary embodiment, the resonator is driven such that beams 102 and 104 resonate in-plane in anti-phase with one another and beams 106 and 108 resonate in-plane in anti-phase with one another. FIG. 4A schematically shows the first and second set drive mode shapes at a point in time when beams 102, 104 are flexed outward and beams 106, 108 are flexed inward relative to their nominal positions (represented by the solid lines). During operation of the gyroscope, each beam alternates between the shape shown in FIG. 4A and the inverse of that shape. Rotations about the x-axis cause out-of-plane deflections of the beams 106 and 108, as depicted in FIG. 4B, while rotations about the y-axis cause out-of-plane deflections of the beams 102 and 104, as depicted in FIG. 4C. In certain specific exemplary embodiments, the resonant beams are configured with the same length L, width W, and nominal node ratio of around 0.275. The thickness T of the beams plays a role in the resonant frequencies and resonant modes of the beams and is typically the same for all beams, although in various alternative embodiments, the pairs of beams may be configured with different thicknesses.

Figure 5:
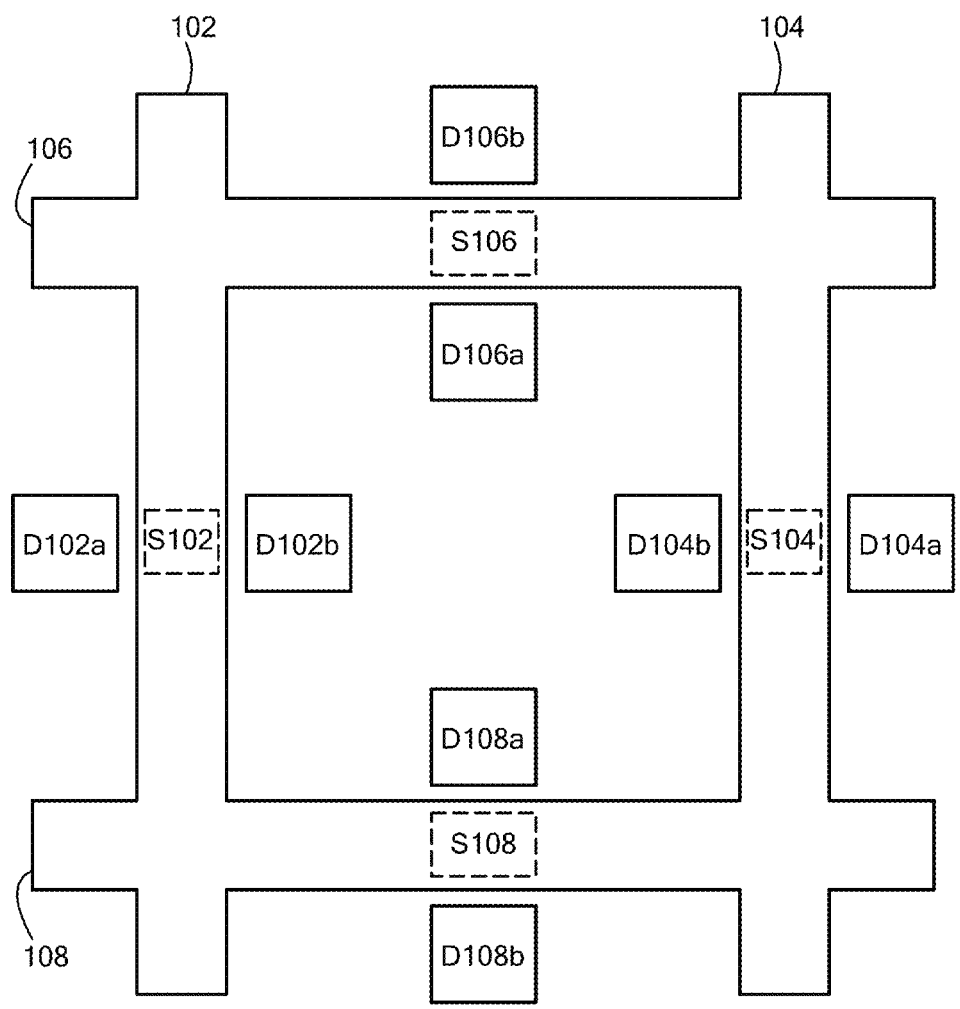
FIG. 5 schematically shows one possible arrangement of drive and sense electrodes to support the mode shapes shown in FIGS. 4A, 4B, and 4C, in accordance with one exemplary embodiment.

FIG. 5 schematically shows one possible arrangement of drive and sense electrodes to support the mode shapes shown in FIGS. 4A, 4B, and 4C. Here, each beam is flanked by two drive electrodes, one on each side of the central section. Specifically, beam 102 is alternately driven by electrodes D102a and D102b, beam 104 is alternately driven by electrodes D104a and D104b, beam 106 is alternately driven by electrodes D106a and D106b, and beam 108 is alternately driven by electrodes D108a and D108b. With the configuration of drive electrodes shown in FIG. 4, drive electrodes D102a, D104a, D106a, and D108a can be driven together, while drive electrodes D102b, D104b, D106b, and D108b can be driven together and in anti-phase with drive electrodes D102a, D104a, D106a, and D108a. It should be noted that the present invention does not require all beams to be explicitly driven or that opposing pairs of drive electrodes be used to drive the beams.

One or more sense electrodes placed under and/or over each beam can be used to sense the out-of-plane deflections caused by Coriolis forces as the gyroscope is rotated about the x and/or y axis. Generally speaking, sense electrode(s) are placed substantially at the anti-nodes of such deflections, e.g., sense electrode S102 underlying beam 102 between drive electrodes D102a and D102b, sense electrode S104 underlying beam 104 between drive electrodes D104a and D104b, sense electrode S106 underlying beam 106 between drive electrodes D106a and D106b, and sense electrode S108 underlying beam 108 between drive electrodes D108a and D108b. The sense electrodes S102-S108 are shown with broken lines to indicate that they are underlying the beams, e.g., on a substrate underlying the resonator. Sense electrodes additionally or alternatively can be placed out-of-plane above the beams in various alternative embodiments.

Rotations about the in-plane y-axis can be sensed differentially using sense electrodes S102 and S104 (e.g., OutputX=S102−S104), and rotations about the in-plane x-axis can be sensed differentially using sense electrodes S106 and S108 (e.g., OutputY=S106−S108).

Figure 12:
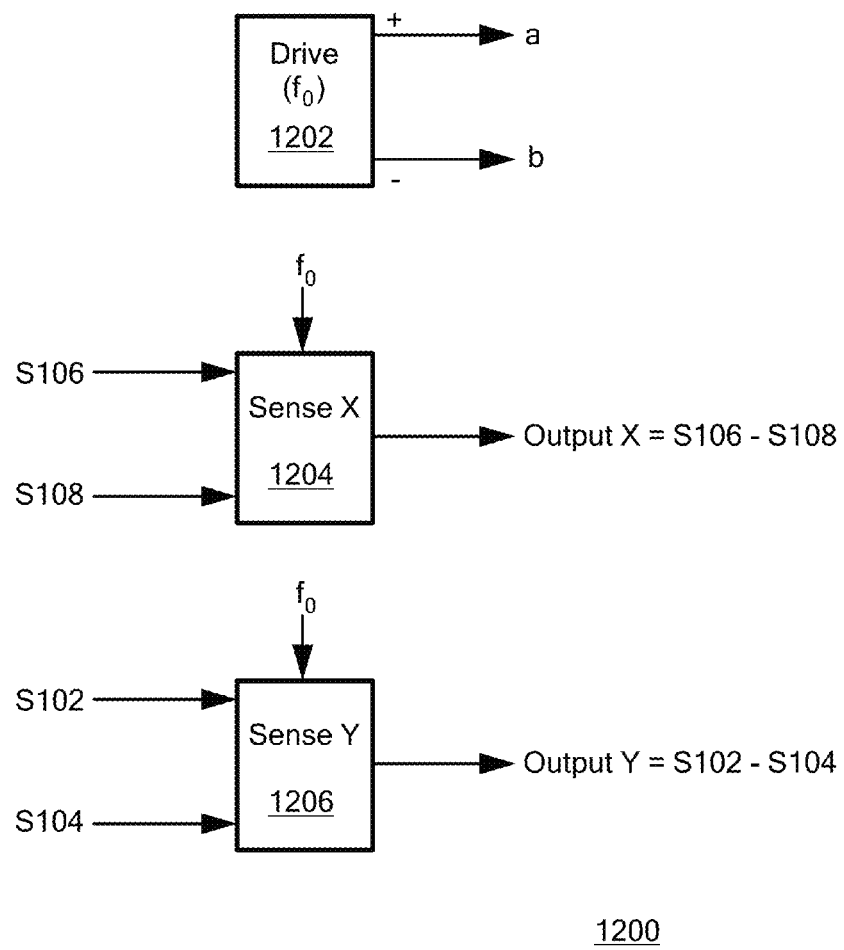
FIG. 12 is a schematic diagram for a gyroscope drive and sense circuit for the gyroscope arrangement shown in FIG. 5, in accordance with one exemplary embodiment.

FIG. 12 is a schematic diagram for an exemplary gyroscope drive and sense circuit 1200 for the gyroscope arrangement shown in FIG. 5. Among other things, the gyroscope drive and sense circuit 1200 includes a drive circuit 1202, an x-axis sense circuit (SenseX) 1204, and a y-axis sense circuit (SenseY) 1206. The drive circuit 1202 provides alternating drive signals to the opposing sets of drive electrodes, e.g., set "a" including drive electrodes D102a, D104a, D106a, and D108a and set "b" including drive electrodes D102b, D104b, D106b, and D108b, with the "a" and "b" electrodes driven in anti-phase with one another at a nominal drive frequency fo. Each sense circuit 1204 and 1206 receives the differential sense signals from its respective pair of sense electrodes (e.g., SenseX 1204 is coupled to sense electrodes S106 and S108 while SenseY 1206 is coupled to sense electrodes S102 and S104) and demodulates the signals at the drive frequency fo and combines the demodulated signals differentially to produce the output signal.

Figure 6:
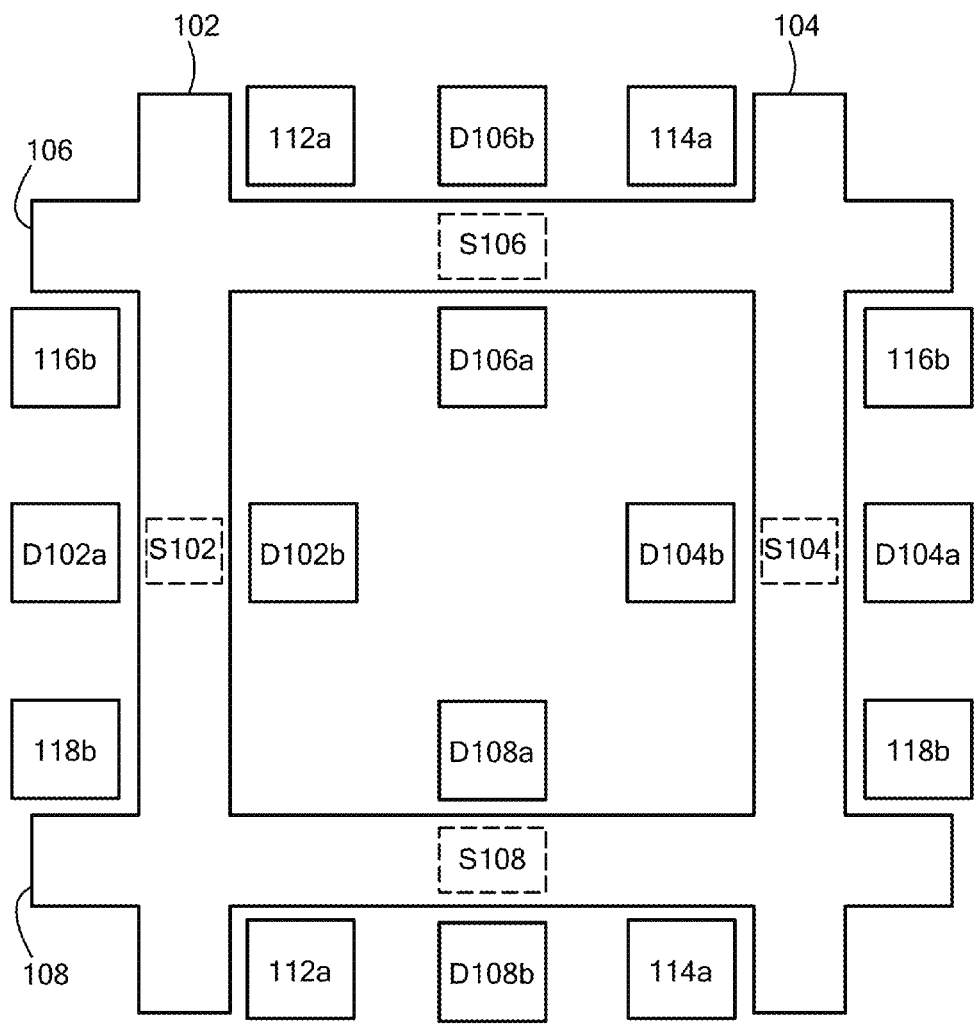
FIG. 6 schematically shows an alternate arrangement of electrodes including a set of optional electrodes placed adjacent to the tail ends of the beams for driving, sensing, or adjusting motion of the beams, in accordance with one exemplary embodiment.

It also should be noted that electrodes additionally or alternatively may be placed adjacent to the tail ends of the beams in-plane and/or out-of-plane, e.g., to drive, sense, and/or adjust motion of the beams. FIG. 6 schematically shows a set of optional electrodes 112a, 114a, 116b, and 118b placed adjacent to the tail ends of the beams in-plane for driving, sensing, or adjusting in-plane motions of the beams. Here, compared to the arrangement of electrodes shown in FIG. 5, additional in-plane electrodes 112a, 114a, 116b, and 118b are included adjacent to the tail ends of the beams. If these electrodes are used for driving motion of the beams, then electrodes 112a and 114a may be driven along with electrodes 102a and 104a while electrodes 116b and 118b may be driven along with electrodes 106b and 108b in order to support the mode shown in FIG. 3. Alternatively, these electrodes may be used for sensing motion of the beams, e.g., to provide a feedback signal for a PLL-based drive circuit. Alternatively, these electrodes may be used for adjusting motion of the beams, e.g., to correct for various manufacturing or operational errors. While the electrodes 112a, 114a, 116b, and 118b shown in FIG. 6 are placed adjacent to the tail ends of the beams in-plane, it should be noted that additional or alternative electrodes may be placed adjacent to the tail ends of the beams out-of-plane for driving, sensing, or adjusting out-of-plane motions of the beams.

FIGS. 7A-7C schematically show a second possible drive mode and corresponding sense modes for a two-axis resonating beam gyroscope having a resonator of the type shown in FIG. 1. In this exemplary embodiment, the first set drive mode shape for beams 102, 104 and the second set drive mode shape for beams 106,108 are different, with beams 102 and 104 resonating in a second harmonic flexural mode (as evidenced by the extra half-wavelength in the mode shape) and beams 106 and 108 resonating in a fundamental (first harmonic) flexural mode. In this exemplary embodiment, the resonator is driven such that beams 102 and 104 resonate in-plane in anti-phase with one another and beams 106 and 108 resonate in-plane in phase with one another. FIG. 7A schematically shows the first and second set drive mode shapes at a particular point in time when the beams are flexed relative to their nominal positions (represented by the solid lines). During operation of the gyroscope, each beam alternates between the shape shown in FIG. 7A and the inverse of that shape. Rotations about the x-axis cause out-of-plane deflections of the beams 106 and 108, as depicted in FIG. 7B, while rotations about the y-axis cause out-of-plane deflections of the beams 102 and 104, as depicted in FIG. 7C. In certain specific exemplary embodiments, the length L2 and width W2 of beams 102, 104 and the length L1 and width W1 of beams 106, 108 are configured so that the beams can operate with the drive and sense mode shapes described above while maintaining a nominal node ratio of around 0.275 for each beam (typically, the widths W1 and W2 are the same, although in various alternative embodiments, the widths W1 and W2 can be different). The thickness T of the beams plays a role in the resonant frequencies and resonant modes of the beams and is typically the same for all beams, although in various alternative embodiments, the pairs of beams can be configured with different thicknesses.

Figure 7:
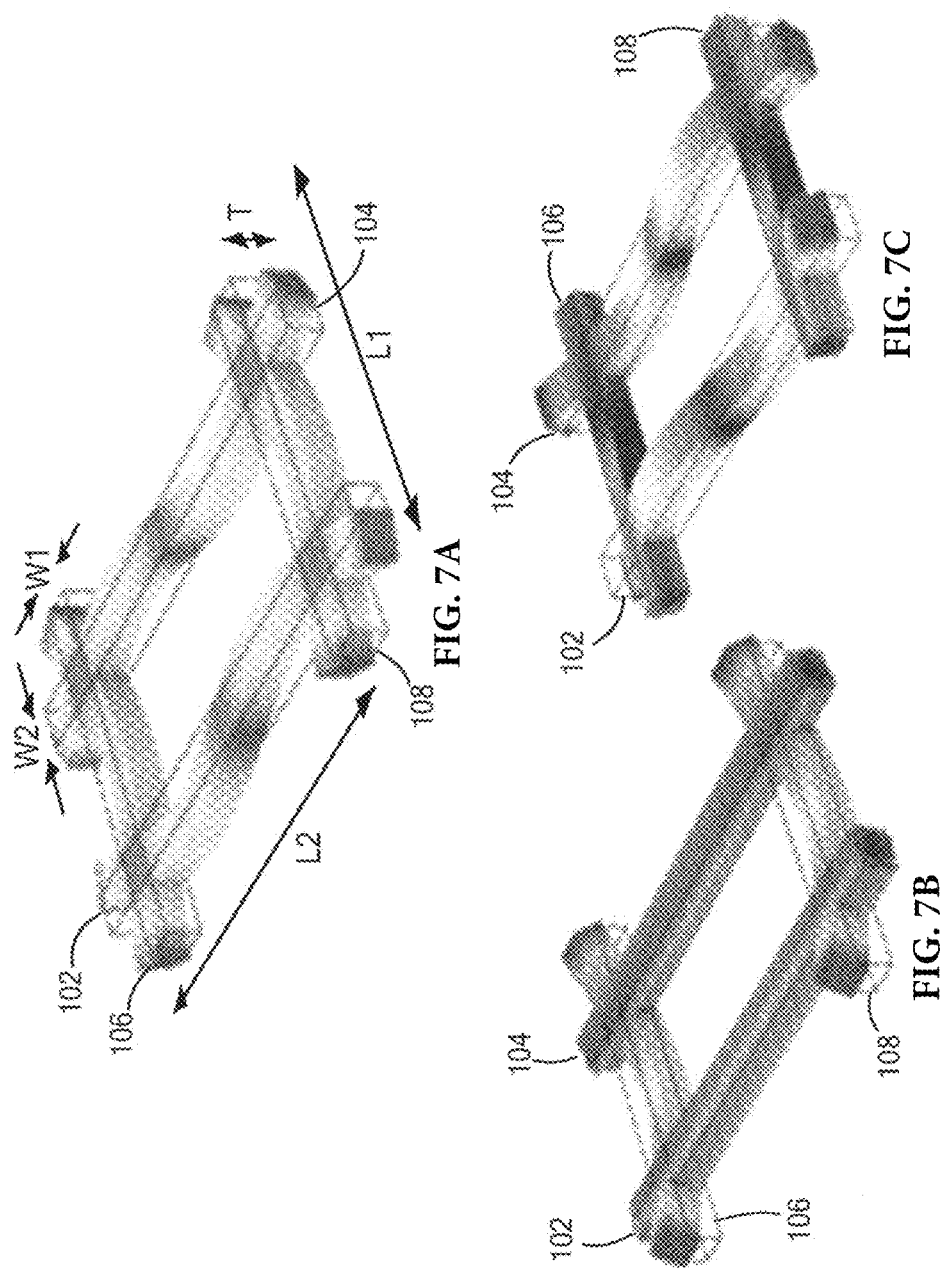
FIGS. 7A, 7B, and 7C schematically show a second possible drive mode and corresponding sense modes for a two-axis gyroscope of the type shown in FIG. 1, in accordance with one exemplary embodiment.
Figure 8:
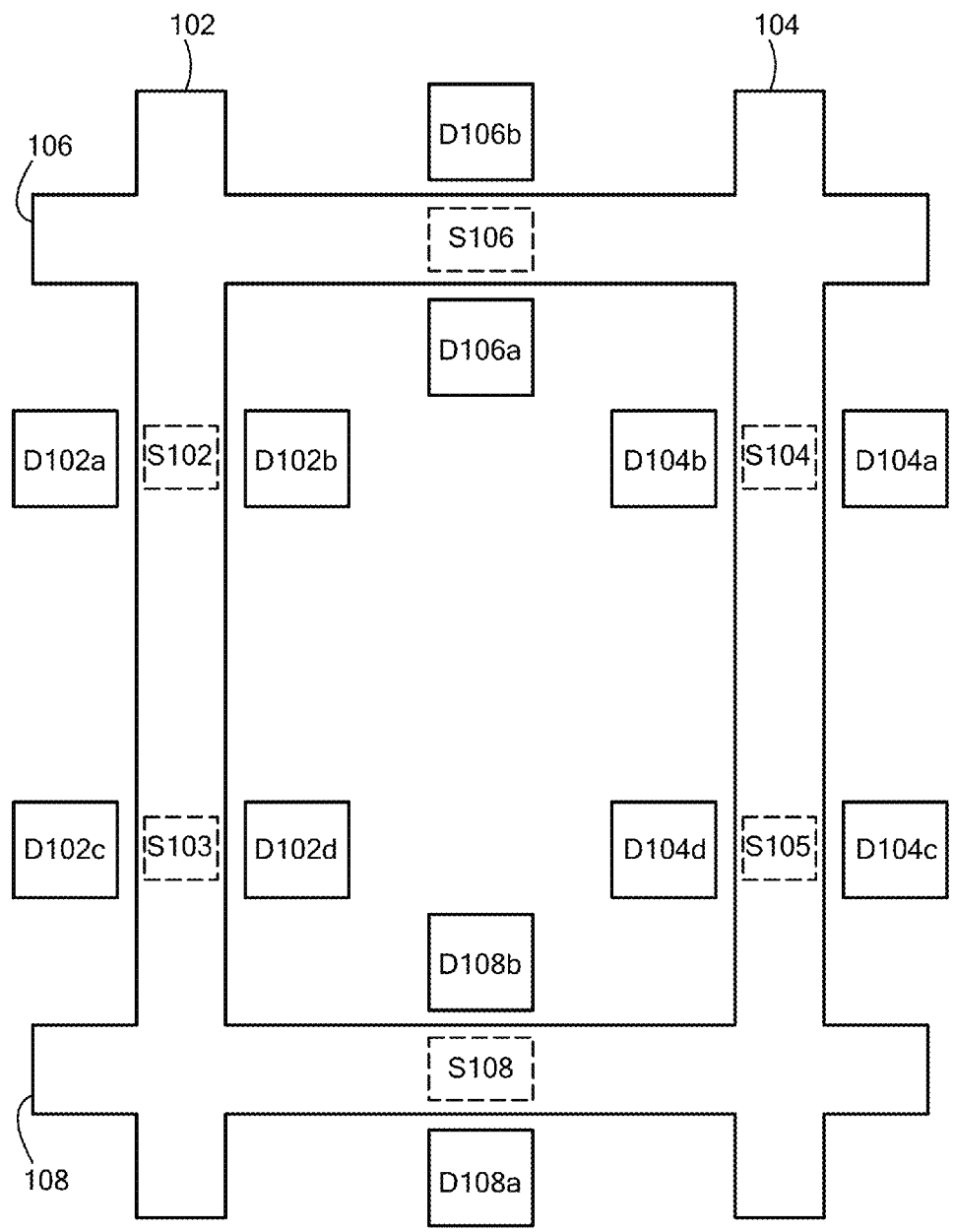
FIG. 8 schematically shows one possible arrangement of drive and sense electrodes to support the mode shapes shown in FIGS. 7A, 7B, and 7C, in accordance with one exemplary embodiment.

FIG. 8 schematically shows one possible arrangement of drive electrodes to support the resonant mode shown in FIGS. 7A-7C. Here, each beam 102 and 104 is flanked by four electrodes, two on each side of the central section, while each beam 106 and 108 is flanked by two electrodes, one on each side of the central section. Specifically, beam 102 is alternately driven by electrode pairs D102a/D102d and D102b/D102c, beam 104 is alternately driven by electrode pairs D104a/D104d and D104b/D104c, beam 106 is alternately driven by electrodes D106a and D106b, and beam 108 is alternately driven by electrodes D108a and D108b. With the configuration of drive electrodes shown in FIG. 6, drive electrodes D102a, D102d, D104a, D104d, D106a, and D108a can be driven together, while drive electrodes D102b, D102c, D104b, D104c, D106b, and D108b can be driven together and in anti-phase with drive electrodes D102a, D102d, D104a, D104d, D106a, and D108a. It should be noted that the present invention does not require all beams to be explicitly driven or that opposing pairs of drive electrodes be used to drive the beams.

One or more sense electrodes placed under and/or over each beam can be used to sense the out-of-plane deflections caused by Coriolis forces as the gyroscope is rotated about the x and/or y axis. Generally speaking, sense electrode(s) are placed substantially at the anti-nodes of such deflections, e.g., sense electrodes S102 and S103 underlying beam 102 between drive electrodes D102a and D102b and between drive electrodes D102c and D102d, respectively; sense electrodes S104 and S105 underlying beam 104 between drive electrodes D104a and D104b and between drive electrodes D104c and D104d, respectively; sense electrode S106 underlying beam 106 between drive electrodes D106a and D106b; and sense electrode S108 underlying beam 108 between drive electrodes D108a and D108b. The sense electrodes S102-S108 are shown with broken lines to indicate that they are underlying the beams, e.g., on a substrate underlying the resonator. Sense electrodes additionally or alternatively can be placed out-of-plane above the beams in various alternative embodiments.

Rotations about the in-plane y-axis can be sensed differentially using sense electrodes S102-S105 [e.g., OutputX=(S102+S105)−(S103+S104)], and rotations about the in-plane x-axis can be sensed differentially using sense electrodes S106 and S108 (e.g., OutputY=S106−S108).

Figure 13:
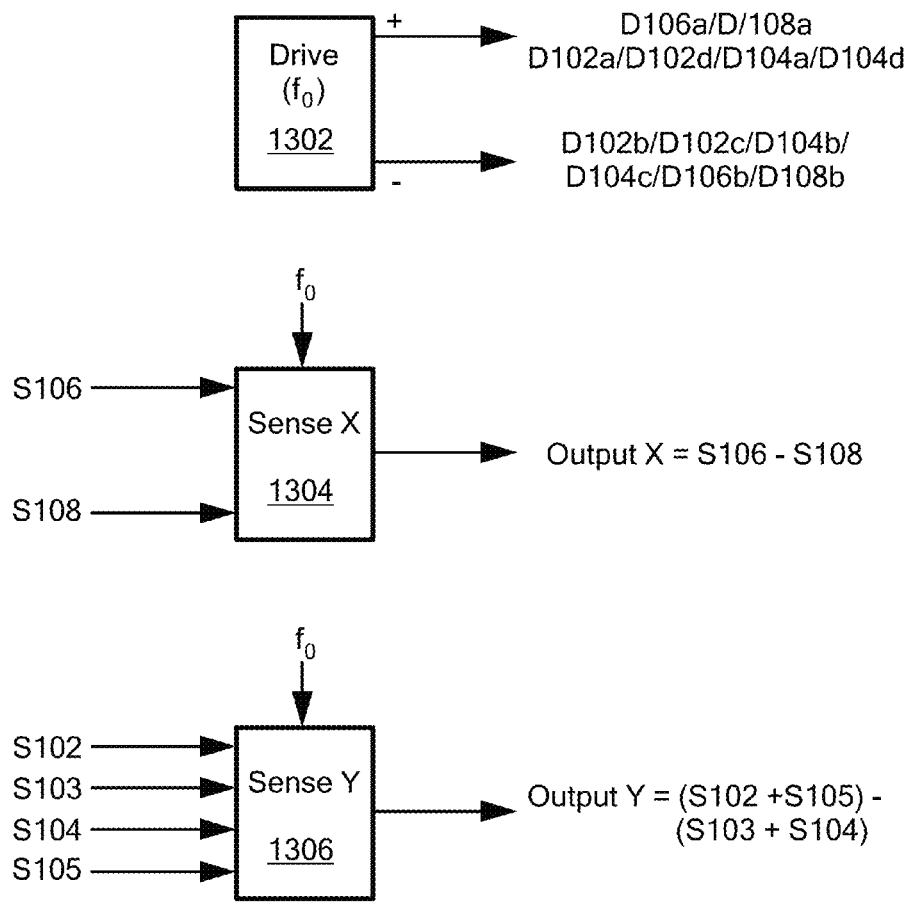
FIG. 13 is a schematic diagram for a gyroscope drive and sense circuit for the gyroscope arrangement shown in FIG. 8, in accordance with one exemplary embodiment.

FIG. 13 is a schematic diagram for an exemplary gyroscope drive and sense circuit 1300 for the gyroscope arrangement shown in FIG. 8. Among other things, the gyroscope drive and sense circuit 1300 includes a drive circuit 1302, an x-axis sense circuit (SenseX) 1304, and a y-axis sense circuit (SenseY) 1306. The drive circuit 1302 provides alternating drive signals to the opposing sets of drive electrodes (D102a/D102d/D104a/D104d/D106a/D108a) and (D102b/D102c/D104b/D104c/D106b/D108b), with the sets of electrodes driven in anti-phase with one another at a nominal drive frequency fo. The SenseX circuit 1304 receives the differential sense signals from sense electrodes S106 and S108 and demodulates the signals at the drive frequency fo and combines the demodulated signals differentially to produce the x-axis output signal. The SenseY circuit 1306 receives the differential sense signals from sense electrodes S102-S105 and demodulates the signals at the drive frequency fo and combines the demodulated signals differentially to produce the y-axis output signal.

As noted above, the tail sections on each beam are very important for allowing the resonance mode of the resonator (e.g., the first and second set drive mode shapes, the first and second sense mode shapes, and the resonance frequency) to be carefully configured. In various alternative embodiments, beams 102, 104 can be the same length and/or width as beams 106, 108 or can be a different length and/or width than beams 106,108; beams 102,104 can have the same proportions as beams 106, 108 or can have different proportions than beams 106, 108 in terms of the length of the central section and tail sections, the first and second set drive mode shapes can be the same or different, and/or the first and second sense mode shapes can be the same or different.

It also should be noted that electrodes additionally or alternatively may be placed adjacent to the tail ends of the beams in-plane and/or out-of-plane, e.g., to drive, sense, and/or adjust motion of the beam, for example, as discussed above with reference to FIG. 6.

In order to avoid hampering motions of the beams, the resonator 100 typically is supported (e.g., anchored to an underlying substrate) by one or more tethers attached at the nodal points where the beams intersect.

Figure 9:
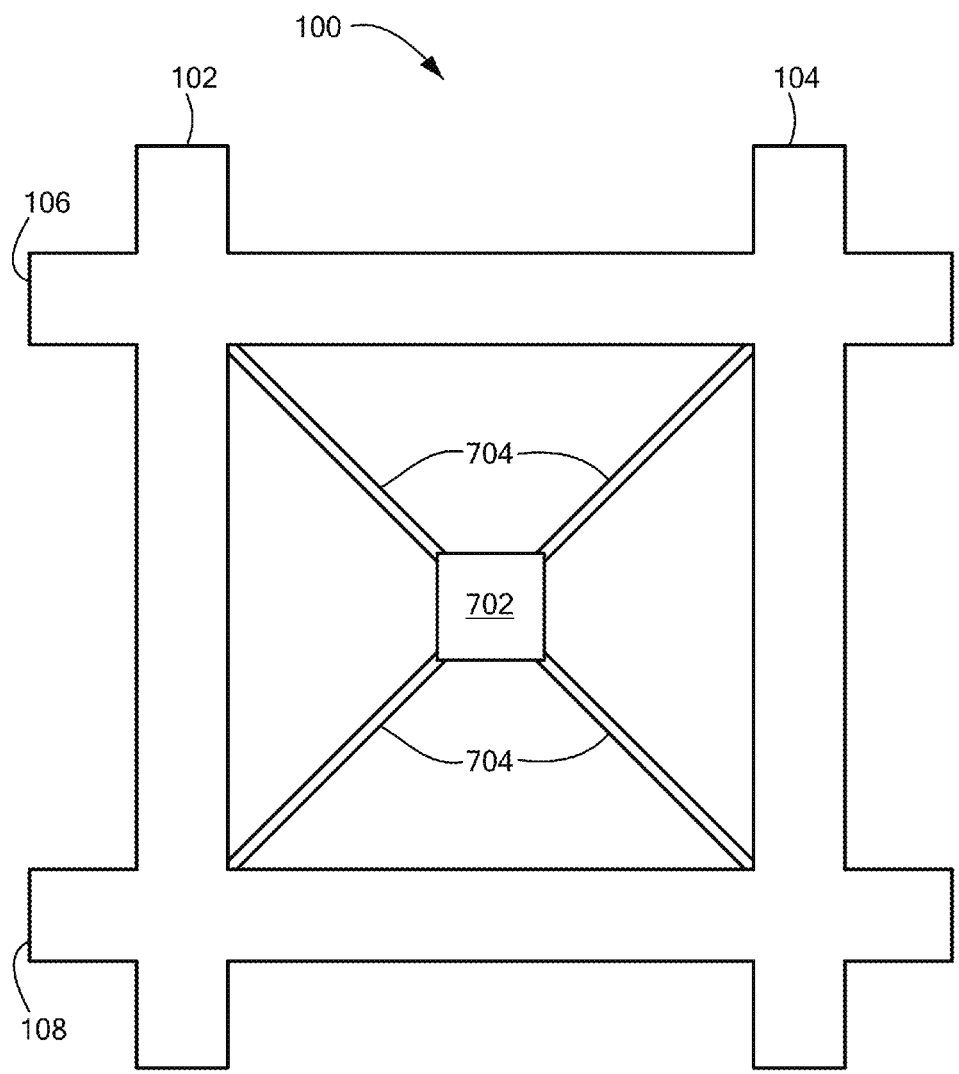
FIG. 9 is a schematic diagram showing a top view of a support system for the resonator of FIG. 1, in accordance with one exemplary embodiment.

FIG. 9 is a schematic diagram showing a top view of a support system for the resonator 100 in FIG. 1, in accordance with one exemplary embodiment. Here, the resonator 100 is supported above an underlying substrate by a central anchor 702 and four tethers 704 extending from the central anchor 702 to the four nodal points. The use of a central anchor 702, as opposed to tethers being anchored further away from the center, tends to isolate the resonator 100 from any stresses that may exist in the underlying substrate that might tend to warp the resonator 100 or otherwise affect the resonant drive mode of the resonator 100. The entire arrangement of the resonator 100 and the support system including the anchor 702 and tethers 704 may be fabricated as a unitary structure from a single layer of material.

Figure 10:
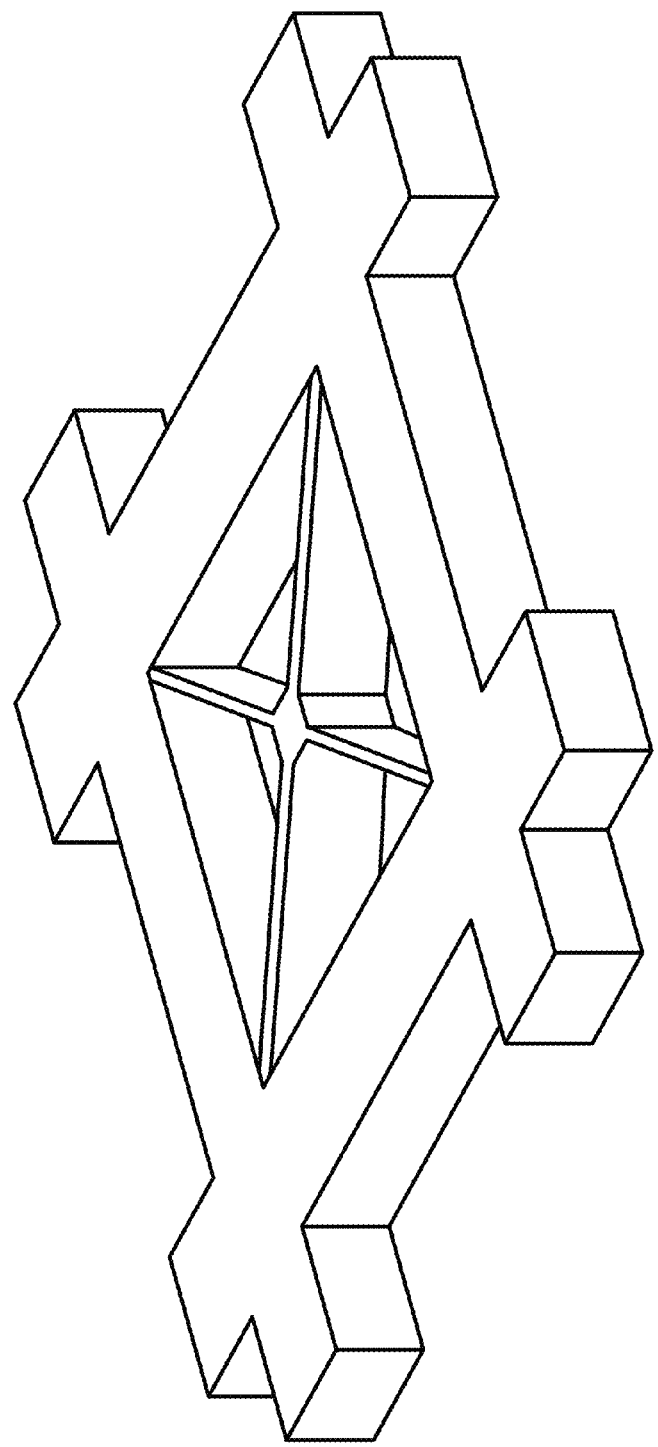
FIG. 10 is a schematic diagram showing a perspective view of the components of FIG. 9.

FIG. 10 is a schematic diagram showing a perspective view of the components of FIG. 7, in accordance with one exemplary embodiment.

Figure 11A:
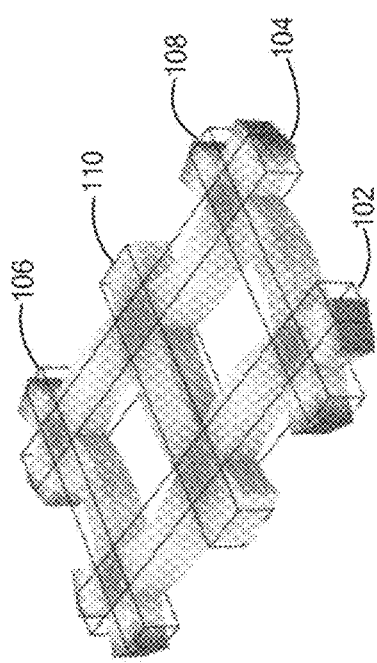
FIGS. 11A, 11B, and 11C schematically show an alternate resonator and corresponding drive and sense modes for a two-axis gyroscope that operates substantially in accordance with the exemplary embodiment of FIGS. 7A, 7B, and 7C.
Figure 11C:
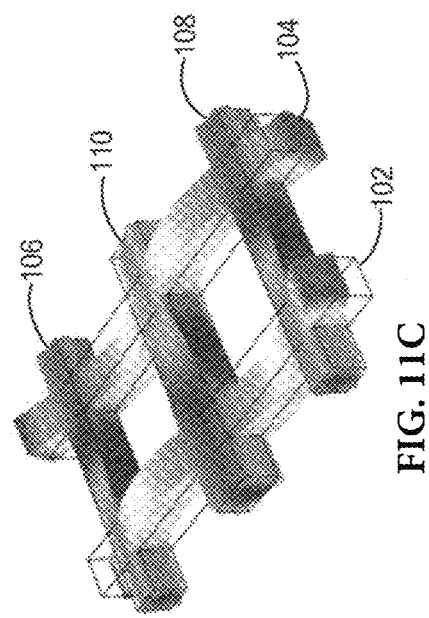
Figure 11B:
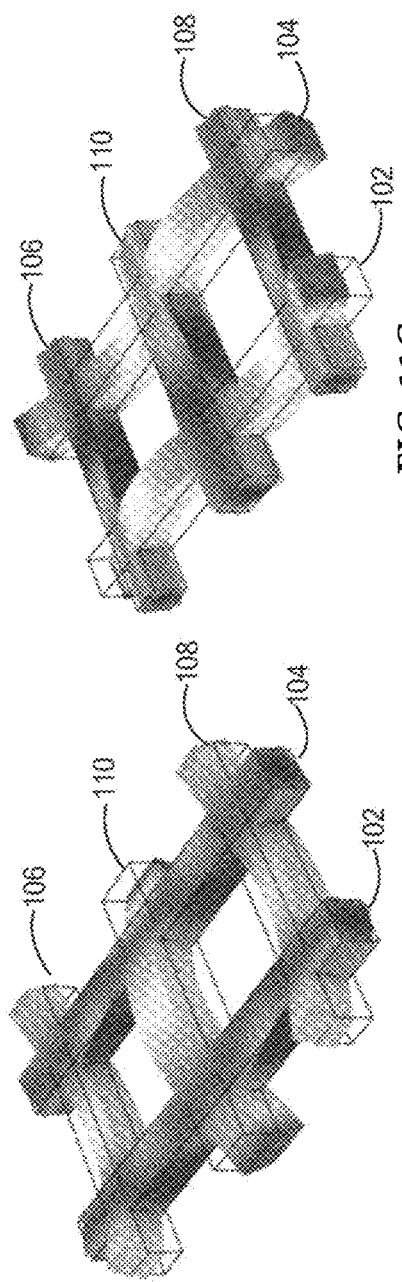

FIGS. 11A-11C schematically show an alternate resonator and corresponding drive and sense modes for a two-axis resonating beam gyroscope that operates substantially in accordance with the exemplary embodiment of FIGS. 7A-7C. Here, an additional resonant beam 110 is included such that the nodal points of the resonant beam 110 intersect with the center nodal points of resonant beams 102 and 104 from the extra half-wavelength of the second harmonic mode. In this exemplary embodiment, beam 110 resonates in-plane in a fundamental (first harmonic) flexural mode in anti-phase to the in-phase resonance of beams 106 and 108 (i.e., the second set drive mode shape is defined here by the flexural modes of the three beams 106, 108, 110). FIG. 11A schematically shows the first and second set drive mode shapes at a particular point in time when the beams are flexed relative to their nominal positions (represented by the solid lines). During operation of the gyroscope, each beam alternates between the shape shown in FIG. 11A and the inverse of that shape. Rotations about the x-axis cause out-of-plane deflections of the beams 106, 108, and 110 with beam 110 deflecting in anti-phase to the out-of-plane deflections of beams 106 and 108, as depicted in FIG. 11B, while rotations about the y-axis cause out-of-plane deflections of the beams 102 and 104, as depicted in FIG. 11C. In certain specific exemplary embodiments, the length and width of beams 102, 104 and the length and width of beams 106, 108, 110 are configured so that the beams can operate with the drive and sense mode shapes described above while maintaining a nominal node ratio of around 0.275 for each beam (typically, the widths are the same, although in various alternative embodiments, the widths can be different). The thickness T of the beams plays a role in the resonant frequencies and resonant modes of the beams and is typically the same for all beams, although in various alternative embodiments, the pairs of beams can be configured with different thicknesses.

Drive electrodes for the embodiment of FIGS. 11A-11C can be arranged substantially as shown in FIG. 8, but with additional drive electrodes oriented similar to D106a/D106b and D108a/D108b flanking the beam 110.

One or more additional sense electrodes (not shown for convenience) can be placed under and/or over the beam 110 to sense the out-of-plane deflections caused by Coriolis forces as the gyroscope is rotated about the x-axis, and these signals can be combined with signals from corresponding sense electrodes associated with beams 106 and 108 to produce the x-axis output signal. Generally speaking, sense electrode(s) are placed substantially at the anti-nodes of such deflections, e.g., underlying beam 110 between two drive electrodes.

Thus, among other things, the beam 110 provides extra structural support for beams 102 and 104 without substantially affecting the first set drive mode shape of beams 102 and 104 (since beam 110 is attached to beams 102 and 104 at nodal points), and also provides for increased sensitivity for x-axis rotations by allowing one or more additional sense electrodes to be used for sensing x-axis rotations.

Support systems of the type described above with reference to FIGS. 9 and 10 may be placed between beams 102, 104, 106, 110 and between beams 102, 104, 110, 108.

Although exemplary embodiments are described above using first harmonic and/or second harmonic drive mode shapes, it should be noted that certain alternative embodiments may use higher-order harmonic drive mode shapes, e.g., one pair of beams may be operated in a third harmonic mode while the other pair of beams may be operated in a fourth harmonic mode, with the lengths, widths, and/or proportions of the beams configured accordingly. In such embodiments, an additional cross-beam can be placed at certain additional nodal point(s).

While some exemplary embodiments of a two-axis gyroscope having a resonator with interconnected beams are described above, it should be noted that certain alternative embodiments instead can be configured to operate as a single-axis gyroscope. For example, one set of parallel beams (e.g., beams 102/104 in FIG. 4A, 4B, 4C, 7A, 7B, 7C, 11A, 11B, or 11C; beams 106/108 in FIG. 4A, 4B, 4C, 7A, 7B, or 7C; or beams 106/108/110 in FIG. 11A, 11B, or 11C) can be configured to resonate and be sensed while the other set of cross-beams are used for nodal supports. In such embodiments, the width of the cross-beam nodal supports can be configured to be substantially narrower than the width of the resonant/sensed beams, which may allow the resonant/sensed beams to resonate more freely.

It should be noted that, in various alternative embodiments, the gyroscopes of the types described above may be operate inversely, i.e., driven in-plane with out-of-plane sensing, or driven out-of-plane with in-plane sensing.

One potential problem with operation of a cross-hatch gyroscope of the type discussed above is that the driven motion of the beams (e.g., in-plane in the exemplary embodiments described above) can include off-axis movements of the beams (e.g., sense-axis movements) that can cause erroneous non-zero differential output signals (often referred to as quadrature error). Such off-axis movements (often referred to as modal coupling) can be caused from various sources typically associated with fabrication imperfections in typical MEMS fabrication processes, such as unequal spring constants of the beams and/or couplings, differences in the dimensions of the drive electrodes, differences in the gaps between the drive electrodes and the beams, and imperfections in the dimensions of the beams (e.g., side wall angle). The manifestation of this problem is as follows: typically in response to an in-plane force, only in-plane displacement is desired; when modal coupling occurs, an in-plane force causes both the desired in-plane displacement in addition to some amount of out-of-plane displacement dependent upon the degree of the fabrication imperfection causing it. The opposite is also true: a purely out-of-plane force will result in both out-of-plane and in-plane displacements. In both cases, the undesired displacement is proportional to both the desired displacement and the degree of imperfection.

One way to reduce or "trim" this error source is to apply an electrostatic force which applies a force in the opposite direction of the undesired displacement in such a manner to null the displacement in the undesired direction. This can be done by having split electrodes on top or bottom of the device at locations of maximum displacement of the mode shape. A differential DC voltage applied to each electrode (Vbias+/−Vtune) can provide the required opposite force to null the undesired displacement.

FIGS. 14A and 14B are schematic diagrams showing an arrangement of split electrodes for reducing modal coupling, in accordance with one exemplary embodiment. Specifically, as shown in FIG. 14A, in this example, the arrangement of split electrodes includes two opposing sets of trim electrodes 802 and 804 placed above the beam 102 (referred to as QTRM− and QTRM+), each having four trim electrodes, two placed along the center section on one side of the beam 102 and one placed along each tail section on the other side of the beam 102. Such placement of the trim electrodes is due to the resonant mode of the beam 102, i.e., when the center section of the beam 102 moves in one in-plane (y-axis) direction, the tail sections of the beam 102 move in the other direction. This arrangement of trim electrodes placed above the beam 102 generally would be appropriate for an out-of-plane drive mode (i.e., in the x-axis direction shown in FIG. 14B) although such arrangement also can be used for an in-plane drive mode; similar trim electrodes placed on the side(s) of the beam 102 generally would be appropriate for an in-plane drive mode (i.e., in the y-axis direction shown in FIG. 14B) although such arrangement also can be used for an out-of-plane drive mode. Generally speaking, a complementary arrangement of trim electrodes would be placed on other resonant beams in the cross-hatch configuration.

FIG. 14B is a cross-sectional view of a beam 102 having a width "W" and pair of opposing trim electrodes 802 and 804, which are spaced from the beam 102 by a gap "g". Here, the trim electrode 802 is a member of the QTRM− set of trim electrodes and receives a compensating voltage signal VQ− while the trim electrode 804 is a member of the QTRM+ set of trim electrodes and receives a compensating voltage signal VQ+. As shown in FIG. 14B, the trim electrodes are "partial-overlap" electrodes, i.e., when the beam 102 is at its nominal (center) position along the y-axis, only part of the width of each trim electrode (represented by "$y_o$") overlaps with the beam 102, and the amount of overlap is the same for the trim electrodes on both sides of the beam 102. When the beam 102 experiences displacement in-plane in the y-axis, the amount of overlap between each trim electrode and the beam 102 changes and hence any force produced on the beam 102 by a particular trim electrode varies in proportion to the amount of displacement. Thus, for example, with reference again to FIG. 14B, if the beam 102 were to move toward the left in the y-axis direction, then the amount of overlap between the trim electrode 802 and the beam 102 would increase and correspondingly the amount of overlap between the trim electrode 804 and the beam 102 would decrease.

In the example shown in FIGS. 14A and 14B, the capacitance between each trim electrode and the beam 102 depends on the nominal gap "g" as well as the x-axis displacement ($x_{disp}$) of the beam 102 from its nominal x-axis position (i.e., capacitance increases as the beam moves toward the trim electrode and decreases as the beam moves away from the trim electrode). Also, because the trim electrodes are variable overlap electrodes, the capacitance between each trim electrode and the beam 102 also depends on the y-axis displacement "y" of the beam 102 relative to the nominal y-axis position "$y_o$" of the beam 102 (i.e., capacitance increases as the overlap increases and decreases as the overlap decreases). The differential capacitances dC− and dC+ per unit length of the beam 102 with respect to the QTRM− and QTRM+ electrodes, respectively, can be represented as follows:

$$dC_- = \frac{\epsilon_0 dl(y_0 - y)}{g - x_{disp}}$$

$$dC_+ = \frac{\epsilon_0 dl(y_0 + y)}{g - x_{disp}}$$

As discussed above, even when there is no rotation of the gyroscope, the driven motion of the beam 102 can cause erroneous sense-axis displacements of the beam 102 through modal coupling, and such erroneous sense-axis displacements of the beam 102 are generally proportional to the drive-axis displacement of the beam. Therefore, in order to compensate for such modal coupling, a quadrature cancellation circuit provides correcting voltage signals VQ− and VQ+ on the QTRM− and QTRM+ electrodes, respectively, to produce correcting forces in the sense-axis that substantially cancel the unwanted sense-axis displacements.

Thus, the effective y-axis correcting force Fy in this example can be characterized by:

$$F_y = \frac{1}{2}\frac{\partial C}{\partial y}V^2$$

and consequently:

$$dF_y = \frac{1}{2}\frac{\epsilon_0 dl}{g - x_{disp}}(VQ_+^2 - VQ_-^2)$$

The effective force per trim electrode can be characterized by:

$$dF_{y,QTRM} \sim \frac{1}{2}\frac{\epsilon_0 dl}{g}\left(1 + \frac{x_{disp}}{g}\right)(VQ_+^2 - VQ_-^2)$$

For a single QTRM electrode pair, the part of the force that is linearly proportional to the x-axis drive force can be characterized by:

$$k_{xy,QTRM} \sim \frac{1}{2}\frac{\epsilon_0}{g^2}(VQ_+^2 - VQ_-^2)\int \phi_{mode} dl$$

where the integral component of the equation allows for weighting by mode shape.

It should be noted that trim electrodes of the type shown in FIGS. 14A and 14B can be placed above and/or below the beam. Electrodes can be placed above the beam, for example, by including the electrodes on a cap wafer that is attached to the device wafer containing the beam. Alternatively, the electrodes can be formed in situ with the beam and tethers, for example, by depositing and patterning additional material layers above device layer containing the beam and tethers. In addition to, or in lieu of, the variable-overlap electrodes placed above the beam, similar variable-overlap electrode can be placed below the beam, for example, supported directly or indirectly by a substrate underlying the beam. Thus, in certain embodiments, variable-overlap electrodes may be placed both above and below the beam. Similar trim electrodes additionally or alternatively may be placed at the side(s) of the beam 102.

It also should be noted that embodiments of the present invention may use any of a variety of transduction methods for driving and/or sensing, including, but not limited to, electrostatic transduction or piezoelectric transduction.

The present invention may be embodied in other specific forms without departing from the true scope of the invention, and numerous variations and modifications will be apparent to those skilled in the art based on the teachings herein. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A gyroscope comprising:
    a resonator including a first set of beams arranged parallel to a first axis in a device plane and a second set of beams arranged parallel to a second axis in the device plane normal to the first axis, each beam of the first set of beams coupled to at least two beams of the second set of beams at nodal points of said beam defined with respect to a first set drive mode and a first sense mode for said beam, said nodal points being remote from ends of said beam such that said beam includes a tail portion at each end;
    a set of drive electrodes configured for driving the resonator into a drive mode that includes a fundamental or higher order flexural mode of the first set of beams defining the first set drive mode; and
    a set of sense electrodes configured for sensing the first sense mode.

2. The gyroscope according to claim 1, wherein the first set drive mode is out-of-plane and the first sense mode is in-plane.

3. The gyroscope according to claim 1, wherein the first set drive mode is in-plane and the first sense mode is out-of-plane.

4. The gyroscope according to claim 1, wherein:
    each beam of the second set of beams is coupled to at least two beams of the first set of beams at nodal points of said beam defined with respect to a second set drive mode and a second sense mode for said beam, said nodal points being remote from ends of said beam such that said beam includes a tail portion at each end;
    the drive mode further includes a fundamental or higher order flexural mode of the second set of beams defining the second set drive mode; and
    the set of sense electrodes is further configured for sensing the second sense mode.

5. The gyroscope according to claim 4, wherein a relative length of the tail portions of each beam is characterized by a node ratio of said beam Lnode/L approximately equal to X/(2*(X+1)), where Lnode is the length from the center of said beam to a nodal point, L is the total length of said beam, and X is the order of a flexural drive mode for the beam.

6. The gyroscope according to claim 1, wherein the resonator is a unitary structure.

7. The gyroscope according to claim 1, further comprising at least one support system including a central anchor and tethers extending from the central anchor to a plurality of nodal points.

8. The gyroscope according to claim 1, wherein a relative length of the tail portions of each beam is characterized by a node ratio of said beam Lnode/L approximately equal to X/(2*(X+1)), where Lnode is the length from the center of said beam to a nodal point, L is the total length of said beam, and X is the order of a flexural drive mode for said beam.

9. The gyroscope according to claim 1, further comprising:
a first set of trim electrodes; and
a second set of trim electrodes opposing the first set of trim electrodes, wherein the first and second sets of trim electrodes are configured to produce forces in the direction of deflections of at least one beam of the first set of beams caused by rotation of the gyroscope about the first axis to compensate for erroneous beam deflections in the direction of such deflections.

10. The gyroscope of claim 1, further comprising tethers interconnecting the beams.

11. The gyroscope of claim 10, wherein the tethers are arranged diagonally between the beams.

12. A method of operating a gyroscope having a resonator including a first set of beams arranged parallel to a first axis in a device plane and a second set of beams arranged parallel to a second axis in the device plane normal to the first axis, each beam of the first set of beams coupled to at least two beams of the second set of beams at nodal points of said beam defined with respect to a first set drive mode and a first sense mode for said beam, said nodal points being remote from ends of said beam such that said beam includes a tail portion at each end, the method comprising:
driving the resonator into a drive mode that includes a fundamental or higher order flexural mode of the first set of beams defining the first set drive mode; and
sensing deflections of at least one beam of the first set of beams caused by rotation of the gyroscope about the first axis, said deflections defining the first sense mode.

13. The method according to claim 12, wherein:
driving the resonator comprises driving the resonator into an out-of-plane drive mode; and
sensing deflections comprises sensing an in-plane sense mode.

14. The method according to claim 12, wherein:
driving the resonator comprises driving the resonator into an in-plane drive mode; and
sensing deflections comprises sensing an out-of-plane sense mode.

15. The method according to claim 14, wherein:
each beam of the second set of beams is coupled to at least two beams of the first set of beams at nodal points of said beam defined with respect to a second set drive mode and a second sense mode for said beam, said nodal points being remote from ends of said beam such that said beam includes a tail portion at each end;
the drive mode further includes the second set drive mode; and
the method further comprises sensing deflections of at least one beam of the second set of beams caused by rotation of the gyroscope about the second axis, said deflections defining the second sense mode.

16. The method according to claim 12, further comprising:
providing compensation signals to sets of trim electrodes to produce forces in the direction of such deflections to compensate for erroneous beam deflections in the direction of such deflections.

17. A gyroscope comprising:
a cross-hatch resonator with free-end beams;
means for driving the resonator into a drive mode that includes a fundamental or higher order flexural mode of a first set of beams, said fundamental or higher order flexural mode of the first set of beams defining a first set drive mode; and
means for sensing deflections of at least one beam of the first set of beams caused by rotation of the gyroscope about a first axis, said deflections defining a first sense mode.

18. The gyroscope according to claim 17, wherein the drive mode includes a fundamental or higher order flexural mode of a second set of beams, said fundamental or higher order flexural mode of the second set of beams defining a second set drive mode, and wherein the gyroscope further comprises:
means for sensing deflections of at least one beam of the second set of beams caused by rotation of the gyroscope about a second axis normal to the first axis, said deflections defining a second sense mode.

19. The gyroscope according to claim 17, further comprising:
means for reducing modal coupling between the first drive mode and the first sense mode.

20. The gyroscope of claim 17, further comprising tethers arranged diagonally between the free-end beams.

* * * * *